(12) United States Patent
Jung et al.

(10) Patent No.: US 12,444,734 B2
(45) Date of Patent: Oct. 14, 2025

(54) ANODE ACTIVE MATERIAL, METHOD FOR PREPARING ANODE ACTIVE MATERIAL, ANODE COMPRISING SAME, AND LITHIUM SECONDARY BATTERY

(71) Applicant: LG ENERGY SOLUTION, LTD., Seoul (KR)

(72) Inventors: Dong-Sub Jung, Daejeon (KR); Hyun-Chul Kim, Daejeon (KR); Chang-Ju Lee, Daejeon (KR); Sang-Wook Woo, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 642 days.

(21) Appl. No.: 17/764,808

(22) PCT Filed: Sep. 29, 2020

(86) PCT No.: PCT/KR2020/013427
§ 371 (c)(1),
(2) Date: Mar. 29, 2022

(87) PCT Pub. No.: WO2021/066580
PCT Pub. Date: Apr. 8, 2021

(65) Prior Publication Data
US 2022/0393154 A1  Dec. 8, 2022

(30) Foreign Application Priority Data

Sep. 30, 2019 (KR) .................. 10-2019-0121071

(51) Int. Cl.
| | | |
|---|---|---|
| H01M 4/36 | (2006.01) |
| C01B 32/21 | (2017.01) |
| H01M 4/02 | (2006.01) |
| H01M 4/04 | (2006.01) |
| H01M 4/133 | (2010.01) |
| H01M 4/1393 | (2010.01) |
| H01M 4/587 | (2010.01) |
| H01M 10/0525 | (2010.01) |

(52) U.S. Cl.
CPC .......... *H01M 4/366* (2013.01); *C01B 32/21* (2017.08); *H01M 4/0471* (2013.01); *H01M 4/133* (2013.01); *H01M 4/1393* (2013.01); *H01M 4/587* (2013.01); *C01P 2004/61* (2013.01); *C01P 2004/84* (2013.01); *C01P 2006/40* (2013.01); *H01M 2004/021* (2013.01); *H01M 2004/027* (2013.01); *H01M 10/0525* (2013.01)

(58) Field of Classification Search
None
See application file for complete search history.

(56) References Cited

U.S. PATENT DOCUMENTS

| | | |
|---|---|---|
| 6,027,833 A | 2/2000 | Ueda et al. |
| 6,391,495 B1 | 5/2002 | Choi et al. |
| 10,490,812 B2 | 11/2019 | Yokoi et al. |
| 10,581,069 B2 | 3/2020 | Kim et al. |
| 2012/0135312 A1 | 5/2012 | Takahashi |
| 2012/0148922 A1 | 6/2012 | Takahashi |
| 2015/0243936 A1 | 8/2015 | Miyagi et al. |
| 2017/0062803 A1 | 3/2017 | Sheem |
| 2018/0301699 A1 | 10/2018 | Liang et al. |
| 2020/0235383 A1 | 7/2020 | Shin et al. |
| 2021/0111395 A1 | 4/2021 | Shin et al. |
| 2022/0393154 A1 | 12/2022 | Jung et al. |

FOREIGN PATENT DOCUMENTS

| | | |
|---|---|---|
| CN | 1726168 A | 1/2006 |
| CN | 103151497 A | 6/2013 |
| CN | 103811717 A | 5/2014 |
| CN | 105261734 A | 1/2016 |
| CN | 106505184 A | 3/2017 |
| JP | 2000-164218 A | 6/2000 |
| JP | 2000-357506 A | 12/2000 |
| JP | 2004-210634 A | 7/2004 |
| JP | 2007-173222 A | 7/2007 |
| JP | 4467317 B2 | 5/2010 |
| JP | 2012-74297 A | 4/2012 |
| JP | 2013-84398 A | 5/2013 |
| JP | 2015-187926 A | 10/2015 |
| JP | WO2016/136178 A1 | 11/2017 |
| JP | 2018-183868 A | 10/2018 |
| JP | 7331252 B2 | 8/2023 |
| KR | 10-1396847 B1 | 5/2014 |
| KR | 10-2014-0101640 A | 8/2014 |
| KR | 10-1786714 B1 | 10/2017 |
| KR | 10-1790392 B1 | 10/2017 |
| KR | 10-1791298 B1 | 10/2017 |
| KR | 10-2019-0065148 A | 6/2019 |
| KR | 10-2019-0093177 A | 8/2019 |
| WO | WO 2004/011370 A1 | 2/2004 |
| WO | WO 2012/001844 A1 | 1/2012 |
| WO | WO 2012/001845 A1 | 1/2012 |

OTHER PUBLICATIONS

Machine Translation of JP 2004-210634 A (Year: 2004).*

(Continued)

*Primary Examiner* — Robert S Carrico
(74) *Attorney, Agent, or Firm* — Birch, Stewart, Kolasch & Birch, LLP

(57) ABSTRACT

A negative electrode active material, including: a graphite core; a first carbon coating layer on the graphite core; and a second carbon coating layer on the first carbon coating layer, wherein a crystallinity of the second carbon coating layer is lower than a crystallinity of the first carbon coating layer, or the second carbon coating layer includes hard carbon and the first carbon coating layer includes soft carbon. A negative electrode including the negative electrode active material and a lithium secondary battery including the same are also disclosed.

9 Claims, No Drawings

(56) References Cited

OTHER PUBLICATIONS

International Search Report for PCT/KR2020/013427 mailed on Jan. 22, 2021.
Zhang et al., "Introduction to New Energy Vehicles," University of Electronic Science and Technology of China Press, Jul. 31, 2017, p. 138 (3 pages total), with partial English translation.

* cited by examiner

ANODE ACTIVE MATERIAL, METHOD FOR PREPARING ANODE ACTIVE MATERIAL, ANODE COMPRISING SAME, AND LITHIUM SECONDARY BATTERY

TECHNICAL FIELD

The present disclosure relates to a negative electrode active material, a method for preparing the negative electrode active material, and a negative electrode and a lithium secondary battery including the negative electrode active material. More particularly, the present disclosure relates to a negative electrode active material showing high initial efficiency and excellent rapid charge characteristics, a method for preparing the negative electrode active material, and a negative electrode and a lithium secondary battery including the negative electrode active material.

The present application claims priority to Korean Patent Application No. 10-2019-0121071 filed on Sep. 30, 2019 in the Republic of Korea, the disclosures of which are incorporated herein by reference.

BACKGROUND ART

As technical development and needs for mobile instruments have been increased, secondary batteries as energy sources for such mobile instruments have been increasingly in demand. Among such secondary batteries, lithium secondary batteries having high energy density and operating voltage, long cycle life and a low discharge rate have been commercialized and used widely.

A lithium secondary battery has a structure including an electrode assembly having a positive electrode and a negative electrode, each of which includes an active material coated on an electrode current collector, and a porous separator interposed between both electrodes; and a lithium salt-containing electrolyte injected to the electrode assembly. The electrode is obtained by applying slurry including an active material, a binder and a conductive material dispersed in a solvent to a current collector, followed by drying and pressing.

Lithium metal has been used to date as a negative electrode of a secondary battery. However, since it was known that lithium metal causes a short-circuit in a battery due to lithium dendrite formation, resulting in a risk of explosion, it has been substituted with a carbonaceous compound capable of reversible lithium ion intercalation/deintercalation and maintaining structural and electrical properties.

Such a carbonaceous compound has a significantly low discharge potential of about −3V based on the standard hydrogen electrode potential, and shows excellent electrode cycle life by virtue of significantly reversible charge/discharge behaviors derived from the monoaxial alignability of a graphene layer. In addition, the carbonaceous compound shows an electrode potential of 0V Vs. $Li/Li^+$ upon Li ion intercalation, which is substantially similar to the electrode potential of pure lithium metal. Therefore, when lithium metal forms a battery in combination with an oxide-based positive electrode, higher energy can be obtained advantageously.

Natural graphite used conventionally as a negative electrode has a high capacity per unit weight, but shows increased alignability upon the pressing of an electrode to cause degradation of lithium ion intercalation/deintercalation characteristics, resulting in degradation of the rapid charge characteristics of a battery undesirably.

DISCLOSURE

Technical Problem

The present disclosure is designed to solve the problems of the related art, and therefore the present disclosure is directed to providing a negative electrode active material having high initial efficiency and excellent rapid charge characteristics, and a method for preparing the negative electrode active material.

The present disclosure is also directed to providing a negative electrode including the negative electrode active material and a lithium secondary battery including the same.

Technical Solution

In one aspect of the present disclosure, there is provided a negative electrode active material according to any one of the following embodiments.

According to the first embodiment of the present disclosure, there is provided a negative electrode active material, including:
  a graphite core;
  a first carbon coating layer on the graphite core; and
  a second carbon coating layer on the first carbon coating layer,
  wherein a crystallinity of the second carbon coating layer is lower than a crystallinity of the first carbon coating layer, or
  wherein the second carbon coating layer includes hard carbon and the first carbon coating layer includes soft carbon.

According to the second embodiment of the present disclosure, there is provided the negative electrode active material as defined in the first embodiment, wherein each of an amount of the first carbon coating layer and an amount of the second carbon coating layer is 3 parts by weight to 6 parts by weight based on 100 parts by weight of the graphite core.

According to the third embodiment of the present disclosure, there is provided the negative electrode active material as defined in the first or the second embodiment, wherein the negative electrode active material has an average particle diameter ($D_{50}$) of 7 μm to 25 μm.

According to the fourth embodiment of the present disclosure, there is provided the negative electrode active material as defined in any one of the first to the third embodiments, wherein the graphite core has an average particle diameter ($D_{50}$) of 5 μm to 20 μm.

According to the fifth embodiment of the present disclosure, there is provided the negative electrode active material as defined in any one of the first to the fourth embodiments, wherein a D band of the second carbon coating layer has a full width at half-maximum (FWHM) value corresponding to 1.3 times or more of the FWHM value of a D band of the first carbon coating layer.

According to the sixth embodiment of the present disclosure, there is provided the negative electrode active material as defined in any one of the first to the fifth embodiments, wherein a D band of the second carbon coating layer has a full width at half-maximum (FWHM) value corresponding to 1.3 to 3 times of the FWHM value of a D band of the first carbon coating layer.

In another aspect of the present disclosure, there is provided a method for manufacturing a negative electrode active material according to any one of the following embodiments.

According to the seventh embodiment of the present disclosure, there is provided a method for manufacturing the negative electrode active material as defined in the first embodiment, including the steps of:

mixing graphite with a first carbon precursor to obtain a first mixture; and subjecting the first mixture to a first heat treatment at a temperature ranging from 1,400° C. to 1,600° C. to obtain a first carbon coating layer on a graphite core; and mixing the graphite core having the first carbon coating layer with a second carbon precursor to obtain a second mixture; and subjecting the second mixture to a second heat treatment at a temperature ranging from 1,100° C. to 1,300° C. to form a second carbon coating layer on the first carbon coating layer.

According to the eighth embodiment of the present disclosure, there is provided the method for manufacturing the negative electrode active material as defined in the seventh embodiment, wherein each of an amount of the first carbon coating layer and an amount of the second carbon coating layer may be 3 parts by weight to 6 parts by weight based on 100 parts by weight of the graphite core.

In still another aspect of the present disclosure, there is provided a negative electrode according to the following embodiment.

According to the ninth embodiment of the present disclosure, there is provided a negative electrode including a current collector, and a negative electrode active material layer on at least one surface of the current collector, wherein the negative electrode active material layer includes the negative electrode active material as defined in any one of the first to the sixth embodiments.

In yet another aspect of the present disclosure, there is provided a lithium secondary battery according to the following embodiment.

According to the tenth embodiment of the present disclosure, there is provided a lithium secondary battery including the negative electrode as defined in the ninth embodiment.

Advantageous Effects

According to an embodiment of the present disclosure, there is provide a negative electrode active material including natural graphite coated with double carbon coating layers to increase the carbon coating amount of natural graphite, wherein the double carbon coating layers have a controlled crystallinity. When the negative electrode active material is applied to a negative electrode of a secondary battery, it is possible to provide the secondary battery with high initial efficiency and excellent rapid charge characteristics.

BEST MODE

Hereinafter, preferred embodiments of the present disclosure will be described in detail. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

In one aspect of the present disclosure, there is provided a negative electrode active material, including:

a graphite core;

a first carbon coating layer surrounding the outside of the graphite core; and a second carbon coating layer surrounding the outside of the first carbon coating layer, wherein the second carbon coating layer has a lower crystallinity as compared to the first carbon coating layer, or the second carbon coating layer includes hard carbon and the first carbon coating layer includes soft carbon.

The graphite core may be artificial graphite, natural graphite or a combination thereof. In other words, the graphite core may include crystalline graphite. Since natural graphite generally shows higher capacity as compared to artificial graphite, use of natural graphite as a graphite core is advantageous in terms of capacity.

The graphite core is not particularly limited in its shape, but may have a spherical shape. The spherical graphite may be obtained by subjecting the graphite core used as a starting material to a spheronization process generally known to those skilled in the art. For example, the spherical graphite may be obtained by subjecting the starting material to mechanical treatment, such as impact compression, friction or shear force, so that the particles forming the graphite core may be bent or mingled and the corners of the particles may be cut off. The mechanical treatment may be carried out by using a spheronization device generally known to those skilled in the art, and particular examples of such devices include a mill, such as a counter jet mill (Hosokawa Micron, JP), ACM pulverizer (Hosokawa Micron, JP) or a current jet (Nissin, JP), a particle assembler, such as SARARA (Kawasaki Heavy Industries, Ltd., JP), GRANUREX (Freund Corporation, JP), New-Gra Machine (Seishin, JP) or Acromaster (Kosokawa Micron, JP), a kneader, such as a dispersion kneader or a two-roll, a compression shear processing device, such as a mechano-micro system, an extruder, a ball mill, a planetary mill, a mechano-fusion system, Nobilta, a hybridization or a rotary ball mill, or the like.

The graphite core may have an average particle diameter ($D_{50}$) of 5-20 μm, or 8-12 μm. When the graphite core has an average particle diameter within the above-defined range, the first carbon coating layer may be formed sufficiently uniformly on the surface of the graphite core. When the content of the graphite core falls within the above-defined range, a lithium secondary battery using a negative electrode active material including the graphite core may have excellent output and cycle characteristics.

The negative electrode active material according to the present disclosure includes the first carbon coating layer surrounding the outside of the graphite core, and further includes the second carbon coating layer surrounding the outside of the first carbon coating layer successively.

In general, when the coating amount of amorphous carbon having a larger interplanar distance and a lower crystallinity (crystallization degree) as compared to graphite is increased, rapid charge characteristics are enhanced. However, when the carbon coating amount is excessively large, coated carbon powder causes agglomeration to make it difficult to disintegrate negative electrode active material particles during the preparation of a negative electrode active material, resulting in a significant increase in average particle diameter ($D_{50}$) of the negative electrode active material. This makes it difficult to carry out a coating process during the preparation of a negative electrode active material, and causes the problems of degradation of rate characteristics and degradation of the capacity of an electrode at the optimum density.

Meanwhile, when a single carbon coating layer is formed at once in such a manner that the coating amount of the single carbon coating layer may correspond to the total content of the content (coating amount) of the first carbon coating layer and that of the second carbon coating layer, the materials forming the carbon coating layer may cause the problem of aggregation.

To solve the above-mentioned problem, the negative electrode active material according to the present disclosure includes double carbon coating layers of the first carbon coating layer surrounding the outside of the graphite core, and the second carbon coating layer surrounding the outside of the first carbon coating layer.

Herein, the first carbon coating layer and the second carbon coating layer may be selected in such a manner that they may be differentiated from each other in terms of crystallinity or ingredients.

The second carbon coating layer has a lower crystallinity as compared to the first carbon coating layer (first type), or the first carbon coating layer includes soft carbon and the second carbon coating layer includes hard carbon (second type).

Each of the first carbon coating layer and the second carbon coating layer may be formed by mixing an amorphous carbonaceous material corresponding to a carbon precursor with a material to be coated, and firing the resultant mixture. Particularly, the first carbon coating layer may be formed by mixing graphite with the first carbon precursor and carrying out heat treatment (first heat treatment) so that the first carbon coating layer may surround the outside of the graphite core, and the second carbon coating layer may be formed by mixing the graphite core surrounded with the first carbon coating layer with the second carbon precursor and carrying out heat treatment (second heat treatment) so that the second carbon coating layer may surround the outside of the first carbon coating layer.

For example, the amorphous carbonaceous material may be obtained from at least one amorphous carbon precursor selected from the group consisting of a hard carbon material including sucrose, phenolic resin, naphthalene resin, polyvinyl alcohol resin, furfuryl alcohol resin, polyacrylonitrile resin, polyamide resin, furan resin, cellulose resin, styrene resin, polyimide resin, epoxy resin or vinyl chloride resin; and a soft carbon material including coal pitch, petroleum pitch, polyvinyl chloride, mesophase pitch, tar or heavy oil. However, the scope of the present disclosure is not limited thereto.

The crystallinity of each of the first carbon coating layer and the second carbon coating layer may be determined by comparing FWHM (full width at half-maximum) value of G band and D band according to Raman spectroscopy.

Raman spectroscopy is a method for analyzing the structure of each of the first carbon coating layer and the second carbon coating layer, wherein the peak present in the region near a wave number of 1580 $cm^{-1}$ is referred to as G band, which is a peak representing the $sp^2$ bonding of the carbon coating layer and corresponds to carbon crystals free from structural defects. Meanwhile, the peak present in the region near a wave number of 1360 $cm^{-1}$ in Raman spectroscopy is referred to as D band, which is a peak representing the $sp^3$ bonding of the carbon coating layer and is increased, when an atomic bond formed by $sp^2$ bonding is broken and converted into $sp^3$ bonding. Such D band is increased, when any disorder or defect is generated in the carbon coating layer.

According to the present disclosure, G band of the Raman spectrum of the carbon coating layer may be a peak present in the region of a wave number of 1550-1620 $cm^{-1}$, and D band may be a peak present in the region of a wave number of 1330-1370 $cm^{-1}$. The wave number range of G band and that of D band correspond to the regions that may be shifted depending on laser sources used for Raman spectroscopy. Although there is no particular limitation in Raman values used herein, the values may be determined at a wavelength of 532 nm by using DXR Raman Microscope (Thermo Electron Scientific Instruments LLC).

According to an embodiment of the present disclosure, D band of the second carbon coating layer may have a FWHM value corresponding to 1.3 times or more, particularly 1.3-3 times, more particularly 1.3-2.7 times, and even more particularly 1.3-2 times, of the FWHM value of D band of the first carbon coating layer. When the ratio of the FWHM value of D band of the second carbon coating layer to the FWHM value of D band of the first carbon coating layer satisfies the above-defined range, more defects are generated in the second carbon coating layer, and the second carbon coating layer has a lower crystallinity (crystallization degree) as compared to the first carbon coating layer.

Referring to carbon coating materials, a carbon material having a high crystallinity has a smaller interplanar distance between carbon layers, while an amorphous carbon material having a low crystallinity has a larger interplanar distance between carbon layers. When the secondary batteries using such carbon materials as negative electrode active materials are charged, in the case of a carbon material having a high crystallinity, such as graphite, having a smaller interplanar distance between carbon layers, it is difficult for lithium ions to infiltrate into a gap between graphene layers at once from an electrolyte. On the other hand, in the case of an amorphous carbon material having a lower crystallinity as compared to graphite, lithium ions may infiltrate into the gap with ease by virtue of a large interplanar distance between carbon layers, resulting in an increase in intercalation rate of lithium ions into the carbon layers.

The negative electrode active material according to the present disclosure is designed in such a manner that the crystallinity of a carbon material may be increased gradually in the order of the outermost layer, i.e. the second carbon coating layer, the first carbon coating layer, and the graphite core positioned at the center. In other words, the second carbon coating layer which meets an electrolyte for the first time has the lowest crystallinity, and then the first carbon coating layer having a relatively higher crystallinity as compared to the second carbon coating layer and the graphite core having the highest crystallinity are disposed successively according to the present disclosure. In this manner, lithium ions may infiltrate into the negative electrode active material with ease at the initial stage, and then may be intercalated into the carbon layers rapidly, resulting in excellent rapid charge characteristics.

In the second type, the first carbon coating layer includes soft carbon and the second carbon coating layer includes hard carbon.

Soft carbon (graphitizable carbon) may be prepared by heating a byproduct generated from purification of crude oil, such as cokes, needle cokes, coal tar pitch, petroleum pitch or a mixture thereof, to 1000° C.

Hard carbon (non-graphitizable carbon) may include a carbonized product of a carbonaceous material selected from sucrose, phenolic resin, furan resin, furfuryl alcohol, polyacrylonitrile, polyimide, epoxy resin, cellulose, styrene, or a mixture thereof.

In the case of hard carbon, carbon layers are entangled with one another strongly, crystallites are significantly small, and a degree of structural disorder in a precursor is high. Therefore, it is difficult to carry out realignment of the crystal structure for the purpose of graphitization even by using high-temperature firing at 2,500° C. or higher. Meanwhile, in the case of graphitizable soft carbon, graphite layer planes form a structure in which they are aligned in parallel with one another, and thus crystalline graphitization may be carried out with ease.

In the negative electrode active material of the second type, the first carbon coating layer disposed at the internal part, while being in contact with the graphite core, includes soft carbon, while the outermost layer of the negative electrode active material, i.e. the second carbon coating layer, includes hard carbon. As described in the above part related with the first type, in the case of the negative electrode active material of the second type, the second carbon coating layer which meets an electrolyte for the first time shows a significantly small crystallite size and includes hard carbon having a high degree of structural disorder in a precursor. Therefore, in the case of such hard carbon, the interplanar distance between carbon layers is relatively large, thereby facilitating infiltration of lithium ions contained in the electrolyte. On the other hand, the first carbon coating layer includes graphene layer planes aligned relatively in parallel with one another and shows a small interplanar distance between carbon layers, and thus it is difficult for a liquid electrolyte to infiltrate into a gap between the graphene layers at once as compared to the second carbon coating layer. As a result, when the second carbon coating layer which meets the electrolyte for the first time includes hard carbon having a high degree of structural disorder, and then the first carbon coating layer including soft carbon in which graphene layer planes are aligned relatively in parallel with one another as compared to the second carbon coating layer, and the graphite core in which graphene layers are stacked regularly and significantly closely to one another are disposed successively, lithium ions contained originally in an electrolyte may infiltrate into the negative electrode active material with ease and may be intercalated into the carbon layers rapidly, resulting in excellent rapid charge characteristics.

According to an embodiment of the present disclosure, each of the content of the first carbon coating layer and the content of the second carbon coating layer may be independently 3-6 parts by weight, or 4-5 parts by weight, based on 100 parts by weight of the graphite core.

When the content of the first carbon coating layer and that of the second carbon coating layer satisfy the above-defined range, they may cover the graphite core sufficiently to prevent the graphite core from being in direct contact with an electrolyte. In addition, since the surface of the active material is coated with a suitable amount of low-crystallinity amorphous carbon, it is possible to improve output and rapid charge characteristics. It is also possible to prevent the problem of degradation of charge/discharge characteristics of a lithium secondary battery including a negative electrode active material having an excessively high content of carbon coating layers, or the problem of a decrease in absolute amount of spaces capable of lithium intercalation and reduction of the capacity of a lithium secondary battery.

The negative electrode active material may have an average particle diameter ($D_{50}$) of 7-25 μm, or 8-22 μm.

When the average particle diameter ($D_{50}$) of the negative electrode active material satisfies the above-defined range, slurry forming processability may be improved by virtue of easy handling, such as mixing, excellent rapid charge characteristics may be realized, and degradation of electrode capacity may be prevented.

In another aspect of the present disclosure, there is provided a method for manufacturing the negative electrode active material, including the steps of:

mixing graphite with a first carbon precursor and subjecting the resultant mixture to the first heat treatment at a temperature of 1,400-1,600° C. to obtain a product including graphite as a graphite core and a first carbon coating layer surrounding the outside of the graphite core; and mixing the product of the preceding step with a second carbon precursor and subjecting the resultant mixture to the second heat treatment at a temperature of 1,100-1,300° C. to form a second carbon coating layer surrounding the outside of the first carbon coating layer.

First, graphite is mixed with a first carbon precursor, and the resultant product is subjected to the first heat treatment at a temperature of 1,400-1,600° C. to obtain a product including graphite as a graphite core and a first carbon coating layer surrounding the outside of the graphite core.

The graphite may be artificial graphite, natural graphite or a combination thereof.

The first carbon precursor may include an amorphous carbonaceous material. For example, the first carbon precursor may be obtained from at least one amorphous carbon precursor selected from the group consisting of a hard carbon material including sucrose, phenolic resin, naphthalene resin, polyvinyl alcohol resin, furfuryl alcohol resin, polyacrylonitrile resin, polyamide resin, furan resin, cellulose resin, styrene resin, polyimide resin, epoxy resin or vinyl chloride resin; and a soft carbon material including coal pitch, petroleum pitch, polyvinyl chloride, mesophase pitch, tar or heavy oil. However, the scope of the present disclosure is not limited thereto.

The method for mixing graphite with the first carbon precursor is not particularly limited, and any method generally known to those skilled in the art may be used. For example, the mixing may be carried out by using mechanical and chemical processes, such as a kneader, such as a two-roll, a blade, a mechano micro-system, an extruder, a ball mill, a planetary mill, a mechano-fusion system, Nobilta, a hybridization or a rotary ball mill, or by using a spray drying process or an emulsifying process.

The first heat treatment temperature may be 1,400-1,600° C. According to an embodiment of the present disclosure, the first heat treatment temperature may be 1,450-1,550° C. When the first heat treatment temperature satisfies the above-defined range, the graphite core can retain its micropores and the amorphous carbonaceous precursor can be carbonized sufficiently.

Next, the product of the step of forming the first carbon coating layer is mixed with a second carbon precursor, and the resultant mixture is subjected to the second heat treatment at a temperature of 1,100-1,300° C. to form a second carbon coating layer surrounding the outside of the first carbon coating layer.

The second carbon precursor may include an amorphous carbonaceous material in the same manner as the first carbon precursor. Herein, the first carbon precursor and the second carbon precursor may include the same kind of amorphous carbonaceous material, or a different kind of amorphous carbonaceous material.

In addition, the method for mixing the product of the step of forming the first carbon coating layer with the second carbon precursor may be selected from the above-described methods for mixing graphite with the first carbon precursor.

The second heat treatment may be carried out at a temperature of 1,100-1,300° C. According to an embodiment of the present disclosure, the second heat treatment may be carried out at a temperature of 1,150-1,250° C.

When a single carbon coating layer is formed at once in such a manner that the coating amount of the single carbon coating layer may correspond to the total content of the content (coating amount) of the first carbon coating layer and that of the second carbon coating layer, the materials forming the carbon coating layer may cause the problem of aggregation. Therefore, according to an embodiment of the present disclosure, the first carbon coating layer and the second carbon coating layer are formed individually to prevent the above-mentioned problem.

In addition, even though the first carbon coating layer and the second carbon coating layer are formed individually, when the heat treatment temperature of each step is 1,100-1,300° C. corresponding to the second heat treatment temperature, the negative electrode active material may show low initial efficiency undesirably. When the heat treatment temperature of each step is 1,400-1,600° C. corresponding to the first heat treatment temperature, the negative electrode active material may show poor rapid charge characteristics undesirably.

In a variant, there is provided a method for preparing a negative electrode active material, including the steps of:
mixing graphite with a first carbon precursor and subjecting the resultant mixture to the first heat treatment to obtain a product including graphite as a graphite core and a first carbon coating layer surrounding the outside of the graphite core; and
mixing the product of the preceding step with a second carbon precursor and subjecting the resultant mixture to the second heat treatment to form a second carbon coating layer surrounding the outside of the first carbon coating layer,
wherein the first carbon precursor is a material converted into soft carbon after the heat treatment, and the second carbon precursor is a material converted into hard carbon after the heat treatment.

First, graphite is mixed with the first carbon precursor, and the resultant mixture is subjected to the first heat treatment to obtain a product including graphite as a graphite core and a first carbon coating layer surrounding the outside of the graphite core.

The first carbon precursor is not particularly limited, as long as it may be converted into soft carbon after the heat treatment. Particular examples of the first carbon precursor include cokes, needle cokes, coal tar pitch, petroleum pitch or a mixture thereof.

The method for mixing graphite with the first carbon precursor may be selected from the above-mentioned methods for mixing graphite with the first carbon precursor.

The first heat treatment temperature may be 1,400-1,600° C. According to an embodiment of the present disclosure, the first heat treatment temperature may be 1,450-1,550° C. When the first heat treatment temperature satisfies the above-defined range, the graphite core can retain its micropores and the amorphous carbonaceous precursor can be carbonized sufficiently.

Next, the product of the preceding step is mixed with the second carbon precursor, and the resultant mixture is subjected to the second heat treatment to form a second carbon coating layer surrounding the outside of the first carbon coating layer.

The second carbon precursor is not particularly limited, as long as it may be converted into hard carbon after the heat treatment. Particular examples of the second carbon precursor include sucrose, phenolic resin, furan resin, furfuryl alcohol, polyacrylonitrile, polyimide, epoxy resin, cellulose, styrene or a mixture thereof.

The method for mixing the product of the preceding step with the second carbon precursor may be selected from the above-mentioned methods for mixing graphite with the first carbon precursor.

Herein, the second heat treatment may be carried out at a temperature of 1,100-1,300° C. According to an embodiment of the present disclosure, the second heat treatment may be carried out at a temperature of 1,150-1,250° C.

According to an embodiment of the present disclosure, the first carbon coating layer and the second carbon coating layer may be formed in such a manner that each of the content of the first carbon coating layer and the content of the second carbon coating layer may be independently 3-6 parts by weight, or 4-5 parts by weight, based on 100 parts by weight of the graphite core.

When the content of the first carbon coating layer and that of the second carbon coating layer satisfy the above-defined range, they may cover the graphite core sufficiently to prevent the graphite core from being in direct contact with an electrolyte. In addition, since the surface of the active material is coated with a suitable amount of low-crystallinity amorphous carbon, it is possible to improve output and rapid charge characteristics. It is also possible to prevent the problem of degradation of charge/discharge characteristics of a lithium secondary battery including a negative electrode active material having an excessively high content of carbon coating layers, or the problem of a decrease in absolute amount of spaces capable of lithium intercalation and reduction of the capacity of a lithium secondary battery.

In still another aspect of the present disclosure, there is provided a negative electrode including the negative electrode active material.

Particularly, the negative electrode according to an embodiment of the present disclosure includes a current collector, and a negative electrode active material layer disposed on at least one surface of the current collector and including the negative electrode active material according to an embodiment of the present disclosure.

The electrode layer may be formed by coating slurry for a negative electrode active material layer, prepared by dispersing the negative electrode active material according to the present disclosure, a binder and a conductive material in a solvent, on at least one surface of a current collector, followed by drying and pressing.

The current collector is not particularly limited, as long as it has conductivity, while not causing any chemical change in the corresponding battery. For example, copper, stainless steel, aluminum, nickel, titanium, baked carbon, copper or stainless steel surface-treated with carbon, nickel, titanium, silver, etc., aluminum-cadmium alloy, or the like, may be used. Although the current collector is not particularly limited in its thickness, it may have a thickness of 3-500 µm.

The negative electrode active material may be used in an amount of 80-99 wt % based on the total weight of the negative electrode slurry composition.

The binder is an ingredient which assists the binding between the conductive material and the active material, or the binding to the current collector, and is generally used in an amount of 0.1-20 wt % based on the total weight of the negative electrode slurry composition. Particular examples of the binder include polyvinylidene fluoride-co-hexafluoropropylene (PVDF-co-HFP), polyvinylidene fluoride, polyacrylonitrile, polymethyl methacrylate, polyvinyl alcohol, carboxymethyl cellulose (CMC), starch, hydroxypropyl cellulose, regenerated cellulose, polyvinyl pyrrolidone, polytetrafluoroethylene, polyethylene, polypropylene, polyacrylate, styrene butadiene rubber (SBR), lithium polyacrylate (Li-PAA), or the like.

The conductive material is not particularly limited, as long as it causes no chemical change in the corresponding battery and has conductivity. Particular examples of the conductive material include: carbon black, such as carbon black, acetylene black, Ketjen black, channel black, furnace black, lamp black or thermal black; conductive fibers, such as carbon fibers or metallic fibers; fluorocarbon; metal powder, such as aluminum or nickel powder; conductive whisker, such as zinc oxide or potassium titanate; conductive metal oxide, such as titanium oxide; conductive materials, such as polyphenylene derivatives, or the like. The conductive material may be added in an amount of 0.1-20 wt %, based on the total weight of the negative electrode slurry composition.

The dispersion medium may include water or an organic solvent, such as N-methyl-2-pyrrolidone (NMP), and may be used in such an amount that the negative electrode slurry including the negative electrode active material optionally with a binder and a conductive material may have a desired level of viscosity.

In addition, there is no particular limitation in the coating process of the negative electrode slurry, as long as it is a method used currently in the art. For example, a coating process using a slot die may be used. In addition to this, a Mayer bar coating process, a gravure coating process, a dip coating process, a spray coating process, etc. may be used.

In yet another aspect of the present disclosure, there is provided a lithium secondary battery including the negative electrode. Particularly, the lithium secondary battery may be obtained by injecting a lithium salt-containing electrolyte to an electrode assembly including a positive electrode, the above-described negative electrode, and a separator interposed between the positive electrode and the negative electrode.

The positive electrode may be obtained by mixing a positive electrode active material, a conductive material, a binder and a solvent to form slurry and coating the slurry directly onto a metal current collector, or casting the slurry onto a separate support, peeling a positive electrode active material film from the support and laminating the film on a metal current collector.

The active material used in the positive electrode may be any one active material particle selected from the group consisting of $LiCoO_2$, $LiNiO_2$, $LiMn_2O_4$, $LiCoPO_4$, $LiFePO_4$ and $LiNi_{1-x-y-z}Co_xM1_yM2_zO_2$ (wherein each of M1 and M2 independently represents any one selected from the group consisting of Al, Ni, Co, Fe, Mn, V, Cr, Ti, W, Ta, Mg and Mo, each of x, y and z independently represents the atomic ratio of an element forming oxide, and $0 \leq x < 0.5$, $0 \leq y < 0.5$, $0 \leq z < 0.5$, and $0 < x+y+z \leq 1$), or a mixture of at least two of them.

Meanwhile, the same conductive material, binder and solvent as used for manufacturing the negative electrode may be used.

The separator may be a conventional porous polymer film used conventionally as a separator. For example, the porous polymer film may be a porous polymer film made of a polyolefininc polymer, such as ethylene homopolymer, propylene homopolymer, ethylene-butene copolymer, ethylene/hexene copolymer or ethylene/methacrylate copolymer. Such a porous polymer film may be used alone or in the form of a laminate. In addition, an insulating thin film having high ion permeability and mechanical strength may be used. The separator may include a safety reinforced separator (SRS) including a ceramic material coated on the surface of the separator to a small thickness. In addition, a conventional porous non-woven web, such as non-woven web made of high-melting point glass fibers or polyethylene terephthalate fibers, may be used, but the scope of the present disclosure is not limited thereto.

The electrolyte includes a lithium salt as an electrolyte salt and an organic solvent for dissolving the lithium salt.

Any lithium salt used conventionally for an electrolyte for a secondary battery may be used without particular limitation. For example, the anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

The organic solvent contained in the electrolyte may be any organic solvent used conventionally without particular limitation. Typical examples of the organic solvent include at least one selected from the group consisting of propylene carbonate, ethylene carbonate, diethyl carbonate, dimethyl carbonate, ethyl methyl carbonate, methyl propyl carbonate, dipropyl carbonate, dimethyl sulfoxide, acetonitrile, dimethoxyethane, diethoxyethane, vinylene carbonate, sulforan, gamma-butyrolactone, propylene sulfite, and tetrahydrofuran.

Particularly, among the carbonate-based organic solvents, ethylene carbonate and propylene carbonate, which are cyclic carbonates, are organic solvents having a high viscosity and a high dielectric constant, and thus may be used preferably, since they can dissociate the lithium salt in the electrolyte with ease. When such a cyclic carbonate is used after mixing it with a linear carbonate having a low viscosity and a low dielectric constant, such as dimethyl carbonate or diethyl carbonate, it is possible to prepare an electrolyte having higher electrical conductivity, more preferably.

Optionally, the electrolyte used according to the present disclosure may further include additives contained in the conventional electrolyte, such as an overcharge-preventing agent, or the like.

The lithium secondary battery according to an embodiment of the present disclosure may be obtained by interposing the separator between the positive electrode and the negative electrode to form an electrode assembly, introducing the electrode assembly to a pouch battery casing, a cylindrical battery casing or a prismatic battery casing, and then injecting the electrolyte thereto. In a variant, the lithium secondary battery may be obtained by stacking the electrode assemblies, impregnating the stack with the electrolyte, and introducing the resultant product to a battery casing, followed by sealing.

According to an embodiment of the present disclosure, the lithium secondary battery may be a stacked type battery, a wound type battery, a stacked and folded type battery or a cable type battery.

The lithium secondary battery according to the present disclosure may be used for a battery cell used as a power source for a compact device, and may be used preferably as a unit battery for a medium- or large-size battery module including a plurality of battery cells. Particular examples of such medium- or large-size device include electric vehicles, hybrid electric vehicles, plug-in hybrid electric vehicles, power storage systems, or the like. Particularly, the lithium secondary battery may be useful for batteries for hybrid electric vehicles and new & renewable energy storage batteries, requiring high output.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

(1) Preparation of Negative Electrode Active Material

Natural graphite having an average particle diameter ($D_{50}$) of 11 μm, as a graphite core, was mixed with pitch so that the natural graphite might be coated with pitch. Next, the resultant product was subjected to the first heat treatment at 1,500° C. to form a first coating layer surrounding the outside of the natural graphite. Herein, the content (coating amount) of the first carbon coating layer was 5 parts by weight based on 100 parts by weight of the graphite core. Then, the product of the first heat treatment having the first carbon coating layer was mixed with pitch so that the first carbon coating layer formed on the natural graphite might be coated with pitch. After that, the resultant product was subjected to the second heat treatment at 1,200° C. to form a second carbon coating layer surrounding the outside of the first carbon coating layer. Herein, the content (coating amount) of the second carbon coating layer was 5 parts by weight based on 100 parts by weight of the graphite core, i.e. natural graphite. In this manner, a negative electrode active material was obtained, wherein the total content of the first carbon coating layer and the second carbon coating layer was 10 parts by weight based on 100 parts by weight of the graphite core, i.e. natural graphite.

(2) Manufacture of Negative Electrode

The negative electrode active material particles obtained as described above, Super C65 as a conductive material, styrene butadiene rubber (SBR) as a binder and carboxymethyl cellulose (CMC) as a thickener were mixed at a weight ratio of 96:1:2:1, and water was added thereto to prepare negative electrode slurry.

The resultant slurry was applied to copper foil (current collector) with a loading amount of 3.6 mAh/cm². Then, the current collector coated with the negative electrode slurry was pressed, and vacuum dried at a temperature of about 130° C. for 8 hours to obtain a negative electrode.

Example 2

A negative electrode active material and a negative electrode were obtained in the same manner as Example 1, except that the heat treatment temperature used for forming each of the first carbon coating layer and the second carbon coating layer was changed as shown in the following Table 1.

Example 3

A negative electrode active material and a negative electrode were obtained in the same manner as Example 1, except that the heat treatment temperature used for forming each of the first carbon coating layer and the second carbon coating layer was changed as shown in the following Table 1.

Comparative Example 1

A negative electrode active material and a negative electrode were obtained in the same manner as Example 1, except that natural graphite as a graphite core was mixed with pitch so that the natural graphite might be coated with pitch, and the resultant product was heat treated at 1,200° C. to form a first carbon coating layer surrounding the outside of the natural graphite, wherein the content (coating amount) of the first carbon coating layer was 5 parts by weight based on 100 parts by weight of the graphite core, and that the second carbon coating layer was not formed.

Comparative Example 2

A negative electrode active material and a negative electrode were obtained in the same manner as Example 1, except that natural graphite as a graphite core was mixed with pitch so that the natural graphite might be coated with pitch and the resultant product was heat treated at 1,200° C. to form a first carbon coating layer surrounding the outside of the natural graphite, wherein the content (coating amount) of the first carbon coating layer was 10 parts by weight based on 100 parts by weight of the graphite core, and that the second carbon coating layer was not formed.

Comparative Example 3

A negative electrode active material and a negative electrode were obtained in the same manner as Example 1, except that natural graphite as a graphite core was mixed with pitch so that the natural graphite might be coated with pitch and the resultant product was heat treated at 1,500° C. to form a first carbon coating layer surrounding the outside of the natural graphite, wherein the content (coating amount) of the first carbon coating layer was 10 parts by weight based on 100 parts by weight of the graphite core, and that the second carbon coating layer was not formed.

Comparative Example 4

Natural graphite having an average particle diameter ($D_{50}$) of 11 μm, as a graphite core, was mixed with pitch so that the natural graphite might be coated with pitch. Next, the resultant product was subjected to the first heat treatment at 1,200° C. to form a first coating layer surrounding the outside of the natural graphite. Herein, the content (coating amount) of the first carbon coating layer was 5 parts by weight based on 100 parts by weight of the graphite core. Then, the product of the first heat treatment having the first carbon coating layer was mixed with pitch so that the first carbon coating layer formed on the natural graphite might be coated with pitch. After that, the resultant product was subjected to the second heat treatment at 1,500° C. to form a second carbon coating layer surrounding the outside of the first carbon coating layer. Herein, the content (coating amount) of the second carbon coating layer was 5 parts by weight based on 100 parts by weight of the graphite core. In other words, a negative electrode active material and a negative electrode were obtained in the same manner as Example 1, except that the first carbon coating layer and the second carbon coating layer were formed on the graphite core as described above.

Comparative Example 5

A negative electrode active material and a negative electrode were obtained in the same manner as Example 1, except that the first heat treatment temperature was 1,350° C. and the second heat treatment temperature was 1,450° C.

The characteristics of each of the negative electrodes obtained according to Examples 1-3 and Comparative Examples 1-5 are shown in the following Table 1.

were added thereto to prepare an electrolyte. The electrolyte was injected to the electrode assembly to obtain a lithium coin-type half-cell.

Each half-cell was charged in a constant current (CC)/constant voltage (CV) mode (current rate 0.2 C, 5 mV, 0.005 C current cut-off) and discharged in a CC mode to 1.0V during the first three cycles. The negative electrode capacity and initial efficiency determined at this point are shown in the following Table 2. Then, while the half-cell was charged at a current rate of 1.5 C to SOC (state-of-charge) of 80%, SOC (Li plating SOC) at which point lithium plating occurred was determined. The results are shown in the following Table 2.

TABLE 1

| | Average particle diameter of graphite core ($D_{50}$) (μm) | Number of carbon coating Layer | Total content of carbon coating layer(s) based on 100 parts by weight of graphite core (parts by weight) | First carbon coating layer Content of carbon coating layer based on 100 parts by weight of graphite core (parts by weight) | Coating temperature (° C.) | Second carbon coating layer Content of carbon coating layer based on 100 parts by weight of graphite core (parts by weight) | Coating temperature (° C.) |
|---|---|---|---|---|---|---|---|
| Ex. 1 | 11 | 2 | 10 | 5 | 1,500 | 5 | 1,200 |
| Ex. 2 | 11 | 2 | 10 | 5 | 1,450 | 5 | 1,250 |
| Ex. 3 | 11 | 2 | 10 | 5 | 1,550 | 5 | 1,150 |
| Comp. Ex. 1 | 11 | 1 | 5 | 5 | 1,200 | — | — |
| Comp. Ex. 2 | 11 | 1 | 10 | 10 | 1,200 | — | — |
| Comp. Ex. 3 | 11 | 1 | 10 | 10 | 1,500 | — | — |
| Comp. Ex. 4 | 11 | 2 | 10 | 5 | 1,200 | 5 | 1,500 |
| Comp. Ex. 5 | 11 | 2 | 10 | 5 | 1,350 | 5 | 1,450 |

Test Example 1: Evaluation of Battery Capacity and Evaluation of Rapid Charge Characteristics of Battery Each of the negative electrodes according to Examples 1-3 and Comparative Examples 1-5 was used to manufacture a battery in the manner as described hereinafter.

Li metal cut into an area of 1.7671 cm² was used as a positive electrode. In addition, a porous polyethylene separator was interposed between the positive electrode and the negative electrode to form an electrode assembly. Then, 0.5 wt % of vinylene carbonate (VC) was dissolved in a mixed solvent containing ethyl methyl carbonate (EMC) and ethylene carbonate (EC) at a volume ratio of 7:3, and 1 M $LiPF_6$ Test Example 2: Raman Spectroscopy To determine the crystallinity of the first carbon layer and that of the second carbon layer in each of the negative electrode active materials according to Examples 1-3 and Comparative Examples 1-5, Raman spectroscopy was carried out. Raman spectroscopy was carried out by using Renishaw 2000 Raman microscope system with 532 nm laser excitation. To avoid a laser heat effect, a 100× optical lens was used with a low laser output density and an exposure time of 30 seconds. To reduce a deviation depending on position, total 25 points were determined per 5 μm×5 μm region, and the results are shown as average values in the following Table 2.

TABLE 2

| | First carbon coating layer | | Second carbon coating layer | | | | | |
|---|---|---|---|---|---|---|---|---|
| | FWHM (full width at half-maximum) of G band ($cm^{-1}$) | FWHM (full width at half-maximum) of D band ($cm^{-1}$) | FWHM (full width at half-maximum) of G band ($cm^{-1}$) | FWHM (full width at half-maximum) of D band ($cm^{-1}$) | Average particle diameter $D_{50}$ of negative electrode active material (μm) | Capacity (mAh/g) | Initial efficiency (%) | Rapid charge characteristics (Li plating SOC) |
| Ex. 1 | 71.6 ± 2.45 | 63.5 ± 2.23 | 88.3 ± 5.4 | 105.2 ± 6.5 | 12 | 360 | 93.0 | No lithium plating |
| Ex. 2 | 75.0 ± 2.3 | 68.0 ± 3.5 | 86.0 ± 3.8 | 91.0 ± 5.2 | 12 | 360 | 92.9 | No lithium plating |
| Ex. 3 | 68.0 ± 3.3 | 46.0 ± 2.1 | 93.0 ± 4.8 | 122.0 ± 7.3 | 12 | 360 | 93.1 | No lithium plating |

TABLE 2-continued

| | First carbon coating layer | | Second carbon coating layer | | | Battery characteristics | | |
|---|---|---|---|---|---|---|---|---|
| | FWHM (full width at half-maximum) of G band ($cm^{-1}$) | FWHM (full width at half-maximum) of D band ($cm^{-1}$) | FWHM (full width at half-maximum) of G band ($cm^{-1}$) | FWHM (full width at half-maximum) of D band ($cm^{-1}$) | Average particle diameter $D_{50}$ of negative electrode active material (μm) | Capacity (mAh/g) | Initial efficiency (%) | Rapid charge characteristics (Li plating SOC) |
| Comp. Ex. 1 | 85.3 ± 4.5 | 103.3 ± 5.4 | — | — | 12 | 361 | 93.2 | SOC 50 |
| Comp. Ex. 2 | 87.2 ± 3.7 | 103.6 ± 3.5 | — | — | 16 | 360 | 92.0 | SOC 45 |
| Comp. Ex. 3 | 71.3 ± 2.32 | 61.5 ± 3.35 | — | — | 16 | 360 | 93.1 | SOC 40 |
| Comp. Ex. 4 | 89.6 ± 4.2 | 103.1 ± 5.2 | 71.4 ± 1.85 | 62.5 ± 1.65 | 12 | 360 | 93.1 | SOC 41 |
| Comp. Ex. 5 | 78.5 ± 2.5 | 80.4 ± 2.6 | 74.2 ± 2.1 | 69.5 ± 2.8 | 12 | 360 | 93.0 | SOC 42 |

Referring to Table 2, when comparing the FWHM value of G band (peak at about 1580 $cm^{-1}$) and D band (peak at about 1350 $cm^{-1}$) of each of the negative electrode active materials according to Examples 1-3, it can be seen that the second carbon coating layer subjected to heat treatment at 1,150-1250° C. shows a relatively lower crystallinity as compared to the first carbon coating layer subjected to heat treatment at 1,450-1550° C. Particularly, it can be seen that the FWHM values of D bands of the second carbon coating layers of the negative electrode active materials according to Examples 1-3 are about 1.66 times, 1.34 times and 2.65 times higher than the FWHM values of D bands of the first carbon coating layers, respectively. As a result, the secondary batteries using the negative electrode active materials according to Examples 1-3 show high initial efficiency and excellent rapid charge characteristics.

As compared to Examples 1-3, the negative electrode active material according to Comparative Example 1 including a single carbon coating layer coated at once with a coating amount of 5 parts by weight shows lower rapid charge characteristics due to such a low carbon coating amount.

In addition, in the case of the negative electrode active materials according to Comparative Examples 2 and 3, they are prepared by coating a single carbon coating layer at once in an amount of 10 parts by weight, and the secondary batteries using the negative electrode active materials show poor rapid charge characteristics. Since pitch is coated at once in a large amount of 10 parts by weight, natural graphite particles corresponding to graphite cores aggregate with one another to cause an increase in average particle diameter $D_{50}$, resulting in the problem of an increase in diffusion resistance of lithium ions in the natural graphite particles and degradation of rapid charge characteristics.

Further, in the case of Comparative Example 2, after coating 10 parts by weight of pitch, heat treatment is carried out at a relative lower temperature (1,200° C.) as compared to Comparative Example 3. Therefore, a relatively large amount of low-crystallinity carbon coating layer is formed, thereby providing an initial efficiency which is 1.1% lower than the initial efficiency of Comparative Example 3.

In the case of Comparative Example 3, the average particle diameter $D_{50}$ is increased due to the same reason as Comparative Example 2, and the secondary battery shows degraded rapid charge characteristics. In addition, since a higher heat treatment temperature (1,500° C.) is used as compared to Comparative Example 2, the resultant carbon coating layer shows higher crystallinity, and thus the secondary battery shows more degraded rapid charge characteristics as compared to Comparative Example 2.

In the case of Comparative Example 4, heat treatment is carried out at 1,200° C. to form the first carbon coating layer in an amount of 5 parts by weight, and then heat treatment is further carried out at 1,500° C. to form the second carbon coating layer in an amount of 5 parts by weight. The preliminarily coated first carbon coating layer is additionally subjected to heat treatment at 1,500° C. through the heat treatment for forming the second carbon coating layer. Therefore, in the case of the negative electrode active material according to Comparative Example 4, the ratio of the FWHM value of D band of the second carbon coating layer to the FWHM value of D band of the first carbon coating layer is about 0.61. As compared to the negative electrode active materials according to Examples 1-3, the negative electrode active material according to Comparative Example 4 shows an increased crystallinity of the outermost carbon coating layer (second carbon coating layer). As a result, the secondary battery using the negative electrode active material according to Comparative Example 4 shows lower rapid charge characteristics as compared to the secondary batteries using the negative electrode active materials according to Examples 1-3. Meanwhile, as compared to the negative electrode active material according to Comparative Example 3, the negative electrode active material according to Comparative Example 4 has a relative smaller average particle diameter, since it is subjected to a process of forming two carbon coating layers despite the same carbon coating layer content. As a result, when applying the negative electrode active material according to Comparative Example 4 to a secondary battery, the secondary battery shows slightly improved rapid charge characteristics, but the rapid charge characteristics are significantly lower as compared to the secondary batteries using the negative electrode active materials according to Examples 1-3.

In the case of Comparative Example 5, the ratio of the FWHM value of D band of the second carbon coating layer to the FWHM value of D band of the first carbon coating layer is about 0.86. The secondary battery using the negative electrode active material according to Comparative Example 5 shows significantly degraded rapid charge characteristics as compared to the secondary batteries using the negative electrode active materials according to Examples 1-3, due to the same reason as Comparative Example 4. In the negative electrode active material according to Comparative Example 5, the heat treatment temperature used for forming the second carbon coating layer is lower as compared to Comparative Example 4, and thus the second carbon coating layer (outermost coating layer) shows lower crystallinity as compared to the negative electrode active material according to Comparative Example 4. As a result, the secondary battery using the negative electrode active material according to Comparative Example 5 shows slightly improved rapid charge characteristics as compared to the secondary battery using the negative electrode active material according to Comparative Example 4, but the rapid charge characteristics are significantly lower as compared to the secondary batteries using the negative electrode active materials according to Examples 1-3.

What is claimed is:

1. A negative electrode active material, comprising:
   a graphite core;
   a crystalline first carbon coating layer on the graphite core; and
   a crystalline second carbon coating layer on the crystalline first carbon coating layer,
   wherein a crystallinity of the crystalline second carbon coating layer is lower than a crystallinity of the crystalline first carbon coating layer, or
   wherein the crystalline second carbon coating layer comprises hard carbon and the crystalline first carbon coating layer comprises soft carbon, and
   wherein a D band of the crystalline second carbon coating layer has a full width at half-maximum (FWHM) value corresponding to 1.3 times or more of a FWHM value of a D band of the crystalline first carbon coating layer.

2. The negative electrode active material according to claim 1, wherein each of an amount of the crystalline first carbon coating layer and an amount of the crystalline second carbon coating layer is 3 parts by weight to 6 parts by weight based on 100 parts by weight of the graphite core.

3. The negative electrode active material according to claim 1, wherein the negative electrode active material has an average particle diameter ($D_{50}$) of 7 μm to 25 μm.

4. The negative electrode active material according to claim 1, wherein the graphite core has an average particle diameter ($D_{50}$) of 5 μm to 20 μm.

5. The negative electrode active material according to claim 1, wherein the full width at half-maximum (FWHM) value of the D band of the crystalline second carbon coating layer corresponds to 1.3 to 3 times of the FWHM value of the D band of the crystalline first carbon coating layer.

6. A method for manufacturing the negative electrode active material as defined in claim 1, comprising the steps of:
   mixing graphite with a first carbon precursor to obtain a first mixture;
   subjecting the first mixture to a first heat treatment at a temperature ranging from 1,400° C. to 1,600° C. to obtain the crystalline first carbon coating layer on a graphite core; and
   mixing the graphite core having the crystalline first carbon coating layer with a second carbon precursor to obtain a second mixture; and
   subjecting the second mixture to a second heat treatment at a temperature ranging from 1,100° C. to 1,300° C. to form the crystalline second carbon coating layer on the crystalline first carbon coating layer.

7. The method for manufacturing the negative electrode active material according to claim 6, wherein each of an amount of the crystalline first carbon coating layer and an amount of the crystalline second carbon coating layer may be 3 parts by weight to 6 parts by weight based on 100 parts by weight of the graphite core.

8. A negative electrode, comprising:
   a current collector, and
   a negative electrode active material layer on at least one surface of the current collector,
   wherein the negative electrode active material layer comprises the negative electrode active material as defined in claim 1.

9. A lithium secondary battery comprising the negative electrode as defined in claim 8.

* * * * *